(12) United States Patent
Takeda et al.

(10) Patent No.: US 8,407,414 B2
(45) Date of Patent: Mar. 26, 2013

(54) METHOD FOR ANALYZING PERFORMANCE INFORMATION

(75) Inventors: Kei Takeda, Kawasaki (JP); Takato Kusama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/418,724

(22) Filed: Mar. 13, 2012

(65) Prior Publication Data

US 2012/0173697 A1    Jul. 5, 2012

Related U.S. Application Data

(63) Continuation of application No. 13/186,852, filed on Jul. 20, 2011, now Pat. No. 8,209,482, which is a continuation of application No. 12/401,071, filed on Mar. 10, 2009, now Pat. No. 8,006,035, which is a continuation of application No. 11/979,566, filed on (Continued)

(30) Foreign Application Priority Data

Aug. 12, 2003   (JP) .................... 2003-207250

(51) Int. Cl.
    *G06F 11/32* (2006.01)
(52) U.S. Cl. ......... 711/111; 711/114; 711/154; 709/224
(58) Field of Classification Search .................... None
    See application file for complete search history.

(56) References Cited

U.S. PATENT DOCUMENTS

| | | | |
|---|---|---|---|
| 4,310,883 A | 1/1982 | Clifton et al. | |
| 5,623,598 A | 4/1997 | Voigt et al. | |
| 6,078,990 A | 6/2000 | Frazier | |
| 6,301,615 B1 | 10/2001 | Kutcher | |
| 6,346,954 B1 | 2/2002 | Chu et al. | |
| 6,389,432 B1 | 5/2002 | Pothapragada et al. | |
| 6,466,973 B2 | 10/2002 | Jaffe | |
| 6,487,562 B1 | 11/2002 | Mason, Jr. et al. | |
| 6,487,634 B1 | 11/2002 | Bachmat | |
| 6,618,818 B1 | 9/2003 | Wahl et al. | |
| 6,671,776 B1 | 12/2003 | DeKoning | |
| 6,766,416 B2 | 7/2004 | Bachmat | |
| 6,804,627 B1 | 10/2004 | Marokhovsky et al. | |

(Continued)

FOREIGN PATENT DOCUMENTS

| | | |
|---|---|---|
| EP | 0714063 | 5/1996 |
| EP | 0994419 | 4/2000 |

(Continued)

OTHER PUBLICATIONS

Chiueh, T. et al, "Multi-Resolution Video Representation for Parallel Disk Arrays", ACM Press, 1993, pp. 401-409.

(Continued)

*Primary Examiner* — Kevin Verbrugge
(74) *Attorney, Agent, or Firm* — Mattingly & Malur, PC

(57) ABSTRACT

A management computer includes a communication device for communicating with a storage system and a plurality of computers. The management computer also includes a processor executing to: store relation information between the storage system and the plurality of computers; collect a plurality of computer performance information about computer-side I/O loads generated by programs on the plurality of computers, from the plurality of computers; identify a storage resource from a plurality of storage resources in the storage system; and identify at least one computer performance information from the plurality of computer performance information based on the relation information; and output the at least one computer performance information to a display. The at least one computer performance information corresponds to a certain computer-side I/O load that generates a load to the identified storage resource.

33 Claims, 15 Drawing Sheets

SERVER PERFORMANCE INFORMATION TABLE 310

| 511<br>SERVER | 512<br>VOLUME | 513<br>IOPS | 514<br>Read IOPS | 515<br>Write IOPS | 516<br>Xfer | 517<br>Read Xfer | 518<br>Write Xfer | 519<br>TS |
|---|---|---|---|---|---|---|---|---|
| SERVER A | VOLUME A | 15 | 4 | 11 | 78 | 20 | 58 | 10:00 |
| SERVER A | VOLUME B | 778 | 200 | 578 | 400 | 210 | 190 | 10:00 |
| SERVER B | VOLUME C | 757 | 252 | 505 | 78 | 45 | 23 | 10:00 |
| SERVER C | VOLUME D | 78 | 20 | 58 | 79 | 48 | 31 | 10:00 |
| ... | | ... | | | | | | |

Related U.S. Application Data

Nov. 6, 2007, now Pat. No. 7,523,254, which is a continuation of application No. 11/524,935, filed on Sep. 22, 2006, now Pat. No. 7,310,701, which is a continuation of application No. 11/202,552, filed on Aug. 11, 2005, now Pat. No. 7,127,555, which is a continuation of application No. 10/771,113, filed on Feb. 2, 2004, now Pat. No. 7,096,315.

(56) References Cited

U.S. PATENT DOCUMENTS

| | | |
|---|---|---|
| 6,895,485 B1 | 5/2005 | DeKoning et al. |
| 6,910,102 B2 | 6/2005 | Matsunami et al. |
| 6,959,360 B2 | 10/2005 | Murotani et al. |
| 6,961,817 B2 | 11/2005 | Soejima et al. |
| 2002/0073290 A1 | 6/2002 | Litvin |
| 2002/0103969 A1 | 8/2002 | Koizumi et al. |
| 2002/0175938 A1 | 11/2002 | Hackworth |
| 2003/0005119 A1 | 1/2003 | Mercier et al. |
| 2003/0093619 A1 | 5/2003 | Sugino et al. |
| 2003/0200347 A1 | 10/2003 | Weitzman |
| 2003/0204583 A1 | 10/2003 | Kaneda et al. |
| 2004/0059807 A1 | 3/2004 | Klotz et al. |
| 2004/0061701 A1 | 4/2004 | Arquie et al. |
| 2004/0068561 A1 | 4/2004 | Yamamoto et al. |
| 2004/0153728 A1 | 8/2004 | Suzuki et al. |
| 2004/0193827 A1 | 9/2004 | Mogi et al. |

FOREIGN PATENT DOCUMENTS

| | | |
|---|---|---|
| EP | 1271296 | 1/2003 |
| GB | 2351375 | 12/2000 |
| JP | 2000-339098 | 12/2000 |
| JP | 2002-342130 | 11/2002 |
| JP | 2003-216348 | 7/2003 |

OTHER PUBLICATIONS

Baek, S. et al, "Reliability and Performance of Hierarchial RAID with Multiple Controllers", ACM, 2001, pp. 246-254.

FIG.5

SERVER PERFORMANCE INFORMATION TABLE — 310

| 511 | 512 | 513 | 514 | 515 | 516 | 517 | 518 | 519 |
|---|---|---|---|---|---|---|---|---|
| SERVER | VOLUME | IOPS | Read IOPS | Write IOPS | Xfer | Read Xfer | Write Xfer | TS |
| SERVER A | VOLUME A | 15 | 4 | 11 | 78 | 20 | 58 | 10:00 |
| SERVER A | VOLUME B | 778 | 200 | 578 | 400 | 210 | 190 | 10:00 |
| SERVER B | VOLUME C | 757 | 252 | 505 | 78 | 45 | 23 | 10:00 |
| SERVER C | VOLUME D | 78 | 20 | 58 | 79 | 48 | 31 | 10:00 |
| ... | ... | | | | | | | |

FIG.6

SERVER STORAGE MAPPING TABLE — 320

| 611 | 612 | 613 | 614 | 615 | 616 |
|---|---|---|---|---|---|
| SERVER | VOLUME | STORAGE | PORT | LOGICAL VOLUME | RAID GROUP |
| SERVER A | VOLUME A | STORAGE A | PORT A | LOGICAL VOLUME A | RAID GROUP A |
| SERVER A | VOLUME B | STORAGE A | PORT A | LOGICAL VOLUME B | RAID GROUP A |
| SERVER B | VOLUME C | STORAGE B | PORT B | LOGICAL VOLUME C | RAID GROUP A |
| SERVER C | VOLUME D | STORAGE B | PORT B | LOGICAL VOLUME D | RAID GROUP B |
| ... | | | | | |

FIG.7

STORAGE RAID GROUP PERFORMANCE INFORMATION TABLE (330)

| STORAGE | RAID GROUP | IOPS | Read IOPS | Write IOPS | Xfer | Read Xfer | Write Xfer | TS |
|---|---|---|---|---|---|---|---|---|
| STORAGE A | RAID GROUP A | 1500 | 400 | 1100 | 780 | 200 | 580 | 10:00 |
| STORAGE A | RAID GROUP B | 7780 | 2000 | 5780 | 4000 | 2100 | 1900 | 10:00 |
| --- | | --- | | | | | | 10:00 |

STORAGE PORT PERFORMANCE INFORMATION TABLE (340)

| STORAGE | PORT | IOPS | Max IOPS | Min IOPS | Xfer | Max Xfer | Min Xfer | TS |
|---|---|---|---|---|---|---|---|---|
| STORAGE A | PORT A | 1245 | 7844 | 0 | 987 | 7889 | 0 | 10:00 |
| STORAGE A | PORT B | 12 | 475 | 0 | 78 | 788 | 0 | 10:00 |
| --- | | --- | | | | | | |

SCSI INQUIRY INFORMATION — 910

| CONNECTION DESTINATION STORAGE (911) | CONNECTION DESTINATION PORT (912) | CONNECTION DESTINATION LOGICAL VOLUME (913) | CONNECTION DESTINATION RAID GROUP (914) | ... |
|---|---|---|---|---|
| STORAGE A | PORT A | LOGICAL VOLUME A | RAID GROUP A | |

FIG.10

PROCESSING OF SERVER PERFORMANCE INFORMATION COLLECTION PROGRAM

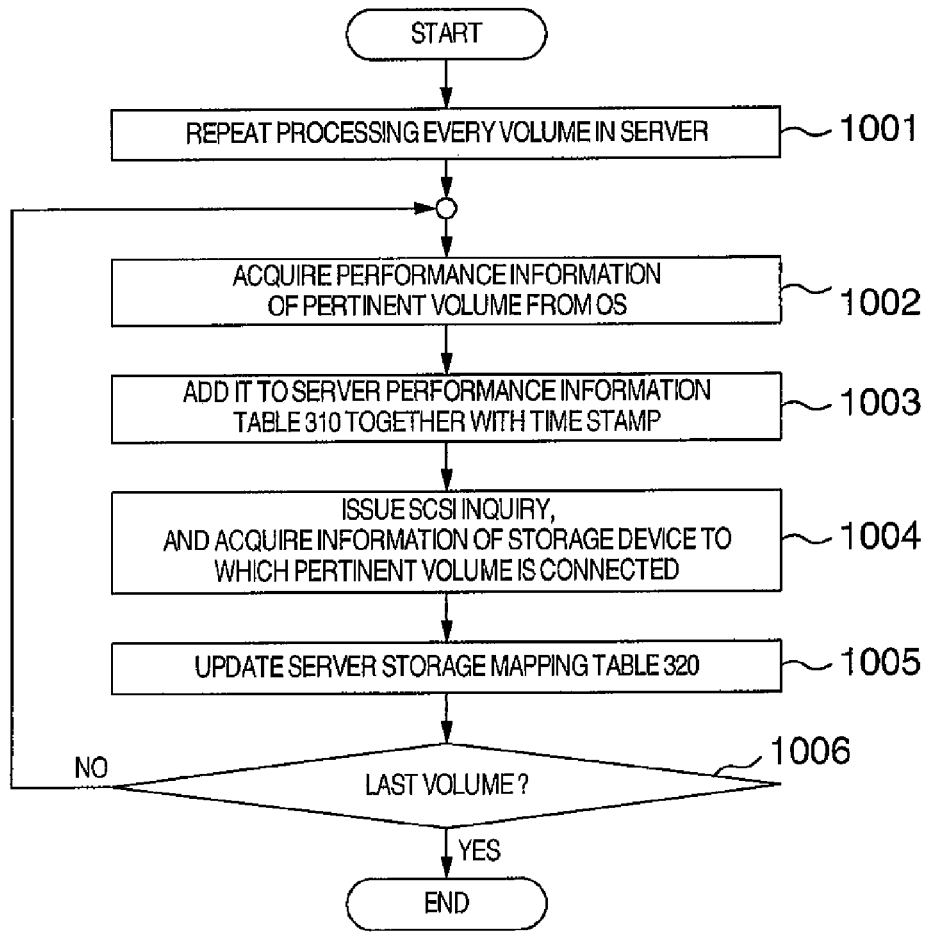

- START
- 1001: REPEAT PROCESSING EVERY VOLUME IN SERVER
- 1002: ACQUIRE PERFORMANCE INFORMATION OF PERTINENT VOLUME FROM OS
- 1003: ADD IT TO SERVER PERFORMANCE INFORMATION TABLE 310 TOGETHER WITH TIME STAMP
- 1004: ISSUE SCSI INQUIRY, AND ACQUIRE INFORMATION OF STORAGE DEVICE TO WHICH PERTINENT VOLUME IS CONNECTED
- 1005: UPDATE SERVER STORAGE MAPPING TABLE 320
- 1006: LAST VOLUME? NO → loop; YES → END

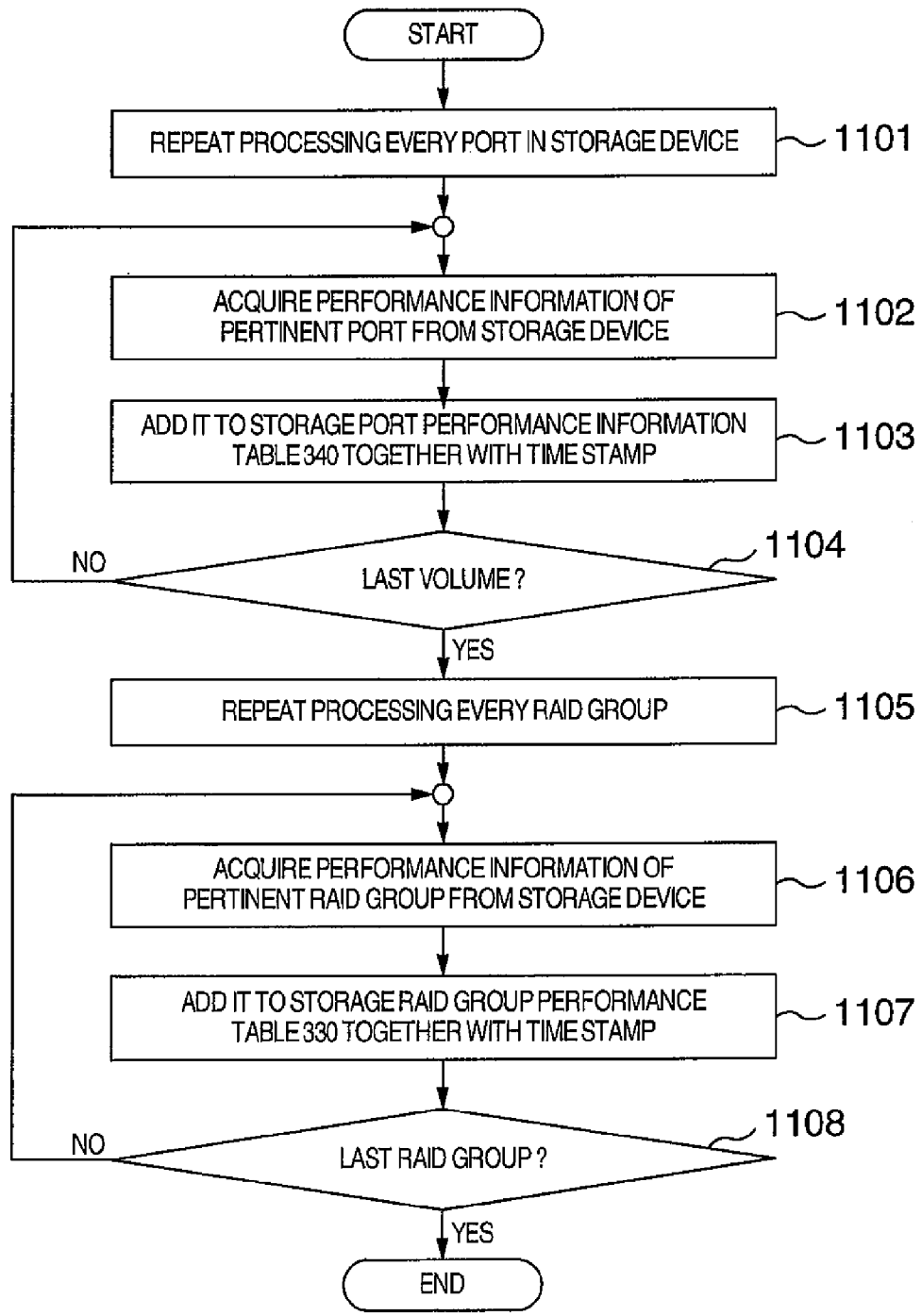

FIG.14

RELATED SERVER PERFORMANCE INFORMATION VIEW — 1220

RELATED SERVER PERFORMANCE INFORMATION DISPLAY REGION

| SERVER | VOLUME | IOPS | Write IOPS | Read IOPS | Xfer | Read Xfer | Write Xfer |
|---|---|---|---|---|---|---|---|
| 1421 | 1422 | 1423 | 1424 | 1425 | 1426 | 1427 | 1428 |
| BUSINESS SERVER A | VOLUME A | 12 | 0 | 12 | 100 | 50 | 50 |
| BUSINESS SERVER A | VOLUME B | 256 | 24 | 232 | 579 | 200 | 379 |
| BUSINESS SERVER B | VOLUME C | 256 | 11 | 113 | 575 | 120 | 455 |
| ... | | ... | | | | | |

1410

1420 — HISTORY INFORMATION

METHOD FOR ANALYZING PERFORMANCE INFORMATION

CROSS REFERENCES

This is a continuation application of U.S. Ser. No. 13/186,852, filed Jul. 20, 2011, which is a continuation application of U.S. Ser. No. 12/401,071, filed Mar. 10, 2009 now U.S. Pat. No. 8,006,035), which is a continuation application of U.S. Ser. No. 11/979,566, filed Nov. 6, 2007 (now U.S. Pat. No. 7,523,254), which is a continuation application of U.S. Ser. No. 11/524,935, filed Sep. 22, 2006 (now U.S. Pat. No. 7,310,701), which is a continuation application of U.S. Ser. No. 11/202,552, filed Aug. 11, 2005, (now U.S. Pat. No. 7,127,555), which is a continuation application of U.S. Ser. No. 10/771,113, filed Feb. 2, 2004, (now U.S. Pat. No. 7,096,315), and which claim priority to JP 2003-207250, filed Aug. 12, 2003. The entire disclosures of all of the above-identified applications are hereby incorporated by reference.

BACKGROUND OF THE INVENTION

The present invention relates to a system for displaying/analyzing performance information of servers and storage devices.

In recent years, configurations in which a plurality of servers share a single storage device have increased because of the development of the SAN (Storage Area Network) technique. The reason why such configurations are increasing is that the localization of the operational business such as backup and fault control is facilitated and the operation management cost can be compressed.

On the other hand, however, since a plurality of servers share a single storage device, volume assignment and storage performance management become complicated. A method for simplifying the volume assignment in the SAN environment is disclosed in US 2003/0005119A1.

In computer systems, the storage device is a low speed storage medium as compared with caches and memories in the CPU. Often, therefore, the storage device becomes a bottleneck for the whole system. Therefore, it is important to acquire various performance index values in the construction phase and the operation phase and make an analysis to determine whether predetermined performance values have been obtained so that the storage device may exhibit as high performance as possible.

In a configuration in which a plurality of servers share and use a single storage device, I/O transactions from a plurality of servers overlap on a specific resource within the storage device and consequently serious performance degradation is caused in some cases.

As an example, I/O loads from a plurality of servers concentrate on a specific physical disk group within a storage device, and the I/O performance seen from the server side is not sufficiently exhibited due to the I/O contention.

Owing to a tool provided by the storage device, the I/O quantity processed by a specific resource within the storage device can be perused/analyzed. In this method, however, it is difficult to discriminate the cause of an I/O contention performance problem caused by setting on the outside of the storage device, i.e., specifically a server group that burdens an I/O load on a specific resource within the storage device or a portion that becomes a bottleneck of the performance.

SUMMARY OF THE INVENTION

An object of the present invention is to provide a method for solving the above-described problem and facilitating the discrimination of a server group that is causing I/O contention on a resource in a storage device and a portion that has become a bottleneck in performance.

In accordance with the present invention, a performance information display method using a computer includes the steps, in the computer, of reading out information data of a storage device previously stored in a storage device and information data of a plurality of devices utilizing the storage device, displaying an identifier of the storage device and identifiers of a plurality of devices utilizing the storage device on a screen on the basis of the information data read out, accepting a command to select the displayed identifier of the storage device, and displaying performance information data of the devices utilizing the selected storage device in association on the basis of the accepted command and the information data read out.

The present invention provides a method of taking a specific resource within the storage device as a starting point and displaying at a stroke performance index values of a server group that burdens the load on the resource. Specifically, a performance management tool according to the present invention collects mapping information between the storage device and the servers and performance information of the server group. If there is a command from the user, the performance management tool searches the mapping information between the storage device and the servers for the server group utilizing a specific resource within the storage device, and creates a report of I/O contention narrowed down to the performance data of the server group.

Other objects, features and advantages of the invention will become apparent from the following description of the embodiments of the invention taken in conjunction with the accompanying drawings.

BRIEF DESCRIPTION OF THE DRAWINGS

FIG. 5 is a diagram showing data items stored in a server performance information table;

FIG. 6 is a diagram showing data items stored in a server storage mapping table;

FIG. 7 is a diagram showing data items stored in a storage RAID group performance information table;

FIG. 8 is a diagram showing data items stored in a storage port performance information table;

FIG. 9 is a diagram showing SCSI inquiry response information;

FIG. 10 is a flow chart showing processing of a server performance information collection program;

FIG. 11 is a flow chart showing processing of a storage performance information collection program;

FIG. 14 is a diagram showing an embodiment of a related server performance information view;

DETAILED DESCRIPTION OF THE EMBODIMENTS

Hereafter, an embodiment of the present invention in a SAN system in which a plurality of servers share a storage device will be described.

Examples of the SAN system in the embodiment described hereafter are simplified as compared with the ordinary SAN system because functions and details that are not necessary for description of the present embodiment are omitted. However, the application range of the present embodiment is not limited thereby.

Figure 1:
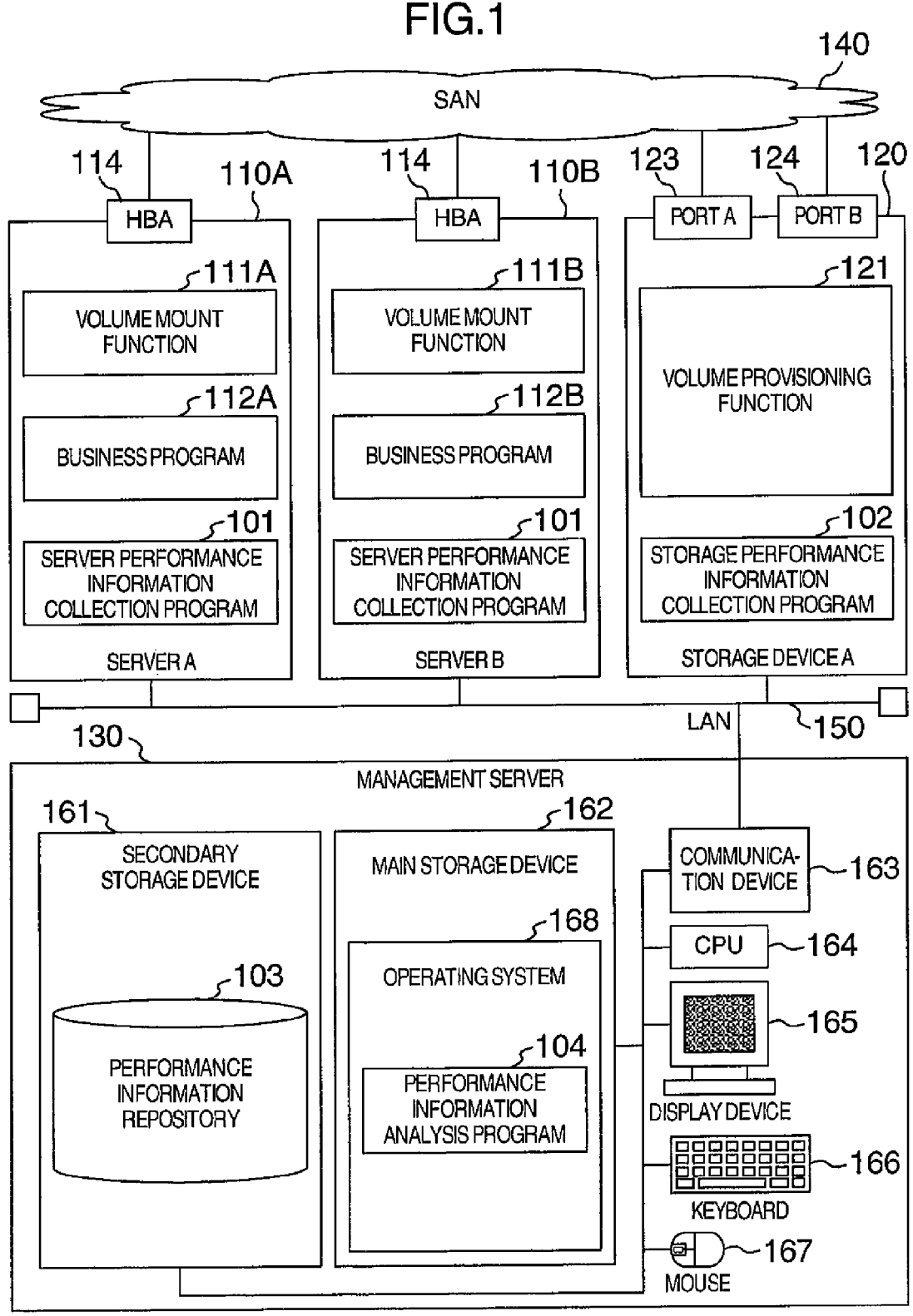
FIG. 1 is a diagram showing a configuration of a SAN system in an embodiment.

FIG. 1 is a diagram showing a configuration of a SAN system in the present embodiment. The present SAN system includes a storage device A 120, a server group including a server A 110A and a server B 110B, a SAN 140 for connecting the server group and the storage device to each other, a management server 130, and a LAN 150 for connecting the server group and the storage device to the management server 130. Each of the servers may be a computer in which a program is executed, a terminal device using the function of the computer, or a different one.

Each of the server group and the storage device A transmits its performance information to the management server 130 via the LAN 150, and the management server 130 stores the performance information in its internal secondary storage device.

The server A 110A is connected to the SAN 140 via an HBA 114. The server A 110A executes a volume mount function 111A for mounting a volume provided from the storage device A 120, a business program 112A for conducting business processing by using the mounted volume, and a server performance information collection program 101 for collecting performance information of a server volume.

In the same way as the server A, the server B 110B is connected to the SAN 140 via an HBA, and the server B 110B executes a volume mount function, a business program, and a server performance information collection program. Here, the SAN and LAN are used as example of the networks. However, other networks such as NASs (Network Attached Storages) may also be used.

The storage device A 120 is connected to the SAN 140 via a port A 123 and a port B 124. Within the storage device A 120, a volume provisioning function 121 for providing a volume for the SAN side and a storage performance information collection program 102 for collecting performance information of the storage device are executed.

In the present embodiment, it is supposed for brevity that one storage device is used, and the server group using the volume provided by the storage device A 120 includes only two servers: the server A 110A and the server B 110B. However, the present embodiment can also be applied to a configuration having more storage devices and more servers.

The management server 130 includes a secondary storage device 161, a main storage device 162, a communication device 163, a CPU 164, a display device 165, a keyboard 166 and a mouse 167. Although not illustrated, the management server 130 also includes functions such as a file system required for a server to recognize data stored in the storage device.

A performance information repository 103 for preserving performance information of the server group and the storage device A 120 is stored in the secondary storage device 161. An operating system 168 is stored in the main storage device 162. Within the operating system 168, a performance information analysis program 104 for analyzing performance information stored in the performance information repository 103 and displaying a result of the analysis on the display device 165.

Figure 2:
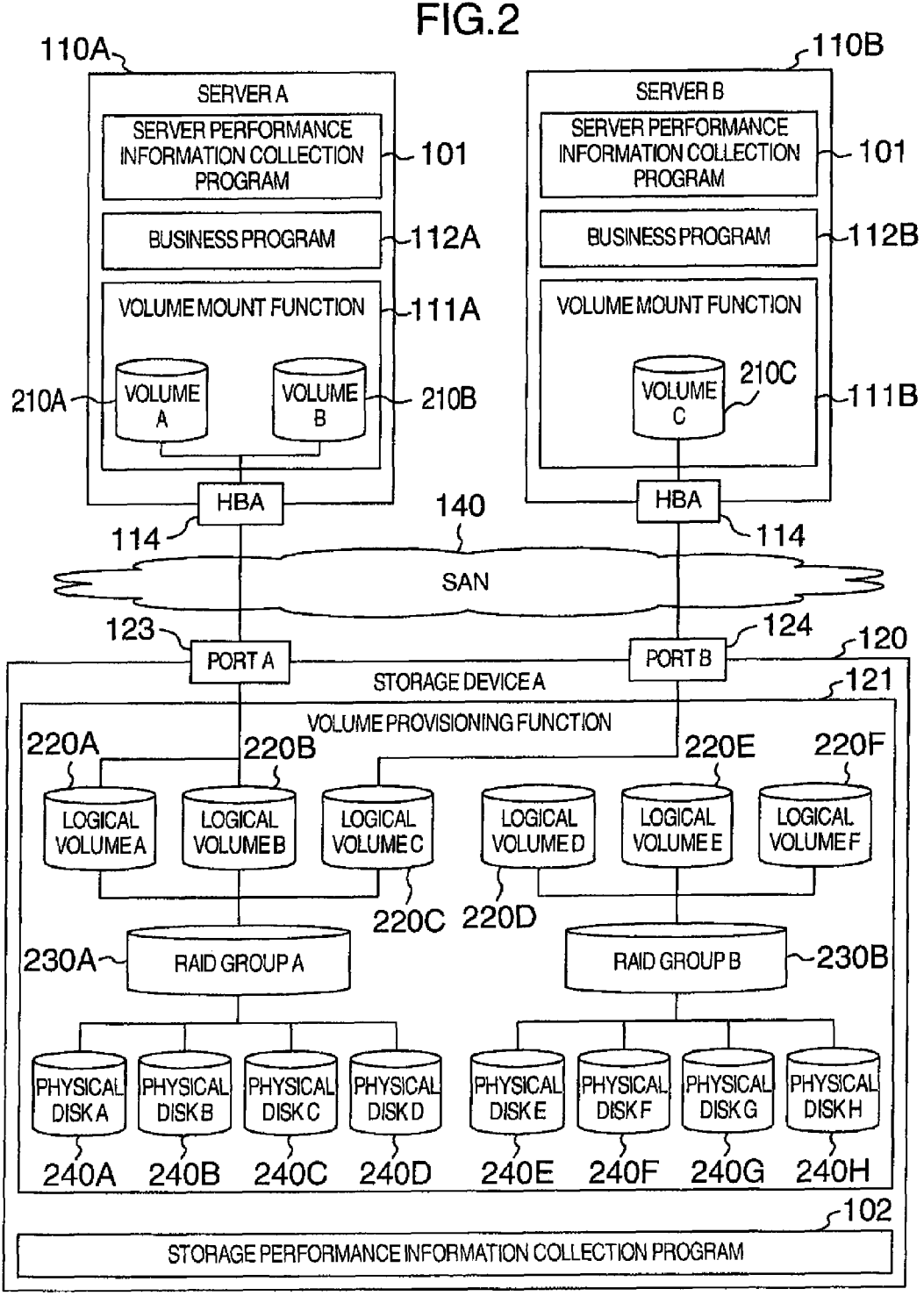
FIG. 2 is a diagram showing a volume provisioning function of a storage device and a volume mount function of a server.

FIG. 2 is a diagram showing the volume provisioning function in the storage device A 120 and the volume mount function in the server group.

First, the volume provisioning function will now be described. The volume provisioning function 120 in the present embodiment provides a function of enhancing the usability of physical disk groups in the storage device A 120 by using a configuration of the RAID (Redundant Array of Independent Disks), slicing a RAID group, which is virtual disks having a RAID configuration, in sizes that can be easily used by higher rank servers, and making logical volumes obtained as a result of the slicing usable from the SAN side via a port. By thus combining a plurality of disks, it becomes possible to make the disk access fast and enhance the fault resistance against failures of disks.

Specifically, the storage device A 120 includes eight physical disks, i.e., a physical disk A 240A, a physical disk B 240B, a physical disk C 240C a physical disk D 240D, a physical disk E 240E, a physical disk F 240F, a physical disk G 240G and a physical disk H 240H. In the present embodiment, the volume provisioning function 121 creates two RAID groups, i.e., a RAID group A 230A and a RAID group B 230B by using these physical disks.

The RAID group is the unit obtained by regarding a plurality of physical disk groups having a RAID configuration as one virtual disk.

Furthermore, in the present embodiment, the volume provisioning function 121 logically slices the created RAID group, and creates six logical volumes as volumes that can be easily used by higher rank servers. In other words, the volume provisioning function 121 creates a logical volume A 220A, a logical volume B 220B and a logical volume C 220C from a RAID group A 230A, and creates a logical volume D 220D, a logical volume E 220E and a logical volume F 220F from a RAID group B 230B. Furthermore, the volume provisioning function 121 opens the logical volumes to ports and makes the logical volumes accessible from the SAN 140 side.

For example, if an I/O request is issued to the logical volume A by a server via the port A, the I/O request is temporarily converted to an I/O request for a corresponding slice portion within the RAID group A, and in addition it is further converted to an I/O request extending over the physical disk A 240A to the physical disk D 240D, which physically form the RAID group A, by the volume provisioning function 121, and processed.

The volume mount function will now be described. The volume mount function 111A in the server A 110A mounts volumes opened to the SAN 140 side from the storage device A 120 into the server A 110A, and makes the volumes usable from the business program 112A. The same holds true for the server B 110B as well. Typically, such a volume mount function is provided as a part of an operating system.

Finally, correlation between server side volumes and storage side volumes in the present embodiment will now be described. In the present embodiment, the server A 110*a* mounts the two volumes, i.e., the volume A 210A and the volume B 210B from the storage device A 120 and uses them. The volume A 210A and the volume B 210B correspond to the logical volume A 220A and the logical volume B 220B in the storage device A 120, respectively.

The server B 110B mounts a volume C 210C from the storage device A 120, and uses it. The volume C 210C corresponds to the logical volume C 220C in the storage device A 120. All of the logical volumes A, B and C are logical volumes sliced from the RAID group A 230A. In the present embodiment, therefore, I/O loads of the server A and the server B become loads of the same RAID group A, and it can be said that physical contention might occur between I/Os in the situation.

Figure 3:
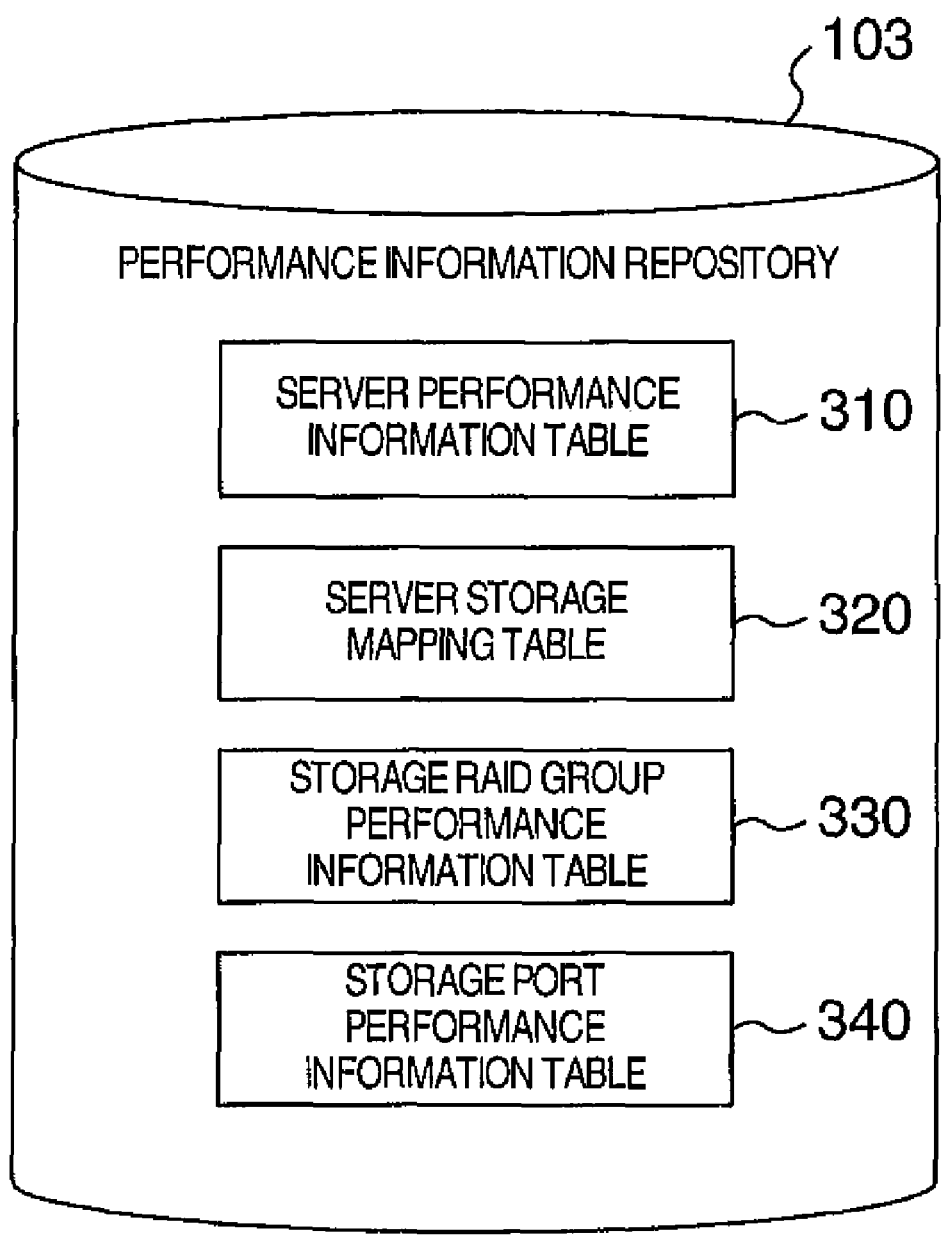
FIG. 3 is a diagram showing an internal structure of a performance information repository.

FIG. 3 is a diagram showing an internal structure of the performance information repository 103 stored in the secondary storage device 161 in the management server 130. The performance information repository 103 includes four tables. A server performance information table 310 is a table storing performance information for the volumes in the server group. A server storage mapping table 320 is a table storing mapping information among the volumes in the servers, the ports in the storage device, the logical volumes and the RAID groups. A storage RAID group performance information table 330 is a table storing performance information for RAID groups in the storage device. A storage port performance information table 340 is a table storing performance information for ports in the storage device.

Figure 4:
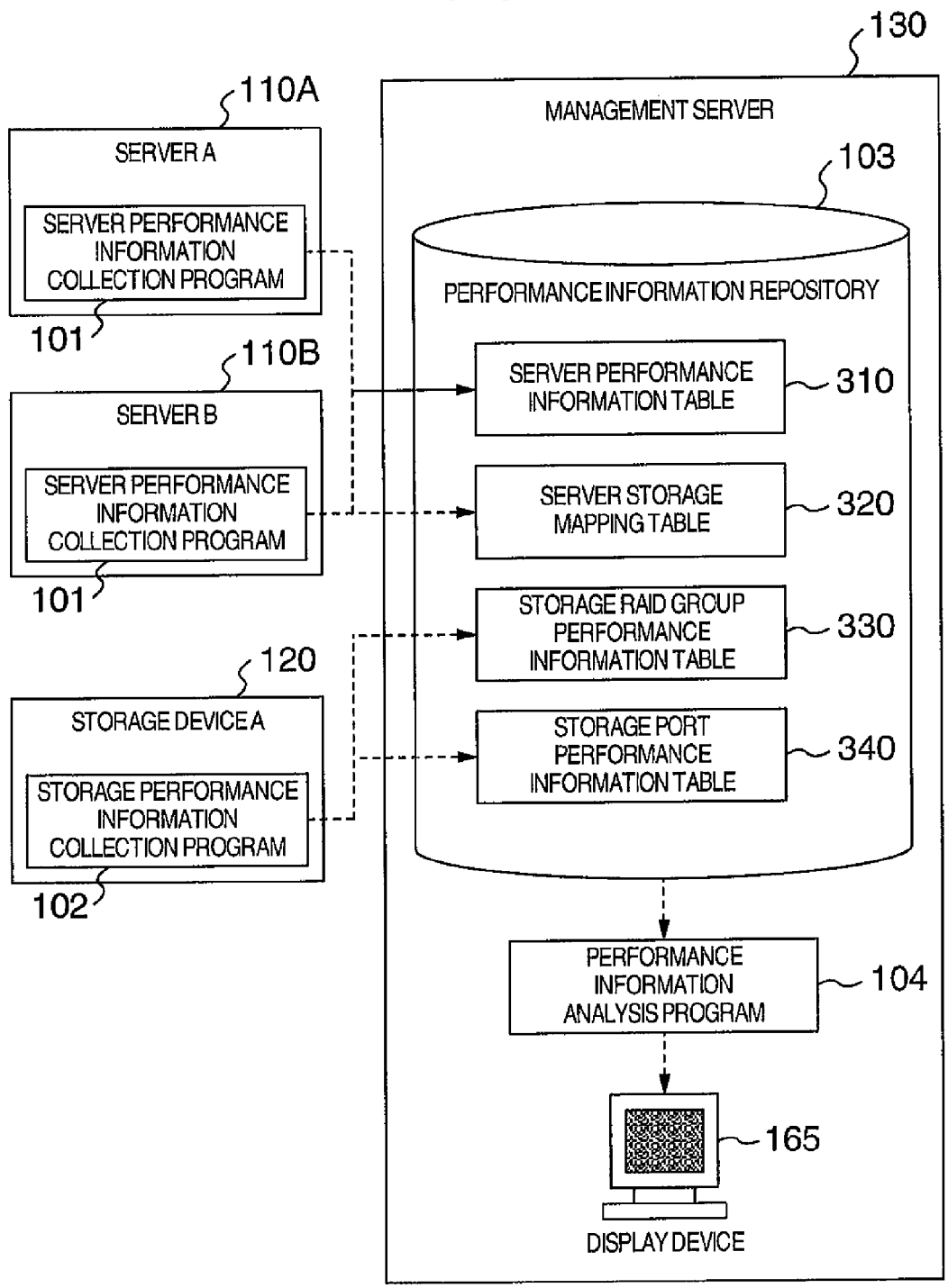
FIG. 4 is a diagram showing a cooperation method between a performance information collection program and a performance information analysis program.

FIG. 4 is a diagram showing a cooperation method between the performance information collection program 101 and the performance information analysis program 104.

As described earlier, the server performance information collection program 101 is operating on the server A 110A and the server B 110B. The server performance information collection program 101 collects performance information for the volumes on the server, and adds records to the server performance information table 310 and the server storage mapping table 320 on the performance information repository 103.

The storage performance information collection program 102 is operating in the storage device A 120. The storage performance information collection program 102 collects performance information for the ports and the RAID groups in the storage device, and adds records to the storage RAID group performance information table 330 and the storage port performance information table 340 on the performance information repository 103.

The performance information analysis program 104 is operating on the management server 130. In response to a request from the user, the performance information analysis program 104 acquires and analyzes the performance information data on the performance information repository 103, and displays its result on the display device 165.

FIG. 5 is a diagram showing data items stored in the server performance information table 310 in detail. The present table is a table storing I/O performance information for the volumes on the servers, and it is a table to which records are added by the server performance information collection program 101. In the present embodiment, the present table includes a server column 511 and a volume column 512, serving as columns for uniquely identifying servers and volumes.

The present table includes an IOPS (IO per second) column 513, a Read IOPS (IO per second) column 514 and a Write IOPS (IO per second) column 515 respectively representing the number of IO times, the number of read IO times and the number of write IO times per second for respective volumes.

The present table includes an Xfer (Transfer) column 516, a Read Xfer (Transfer) column 517 and a Write Xfer (Transfer) column 518 respectively representing the transfer data quantity, read transfer data quantity and the write data quantity per second for respective volumes. Finally, the present table 310 includes a TS column 519 representing time when the performance information was observed.

FIG. 6 is a diagram showing data items stored in the server storage mapping table 320 in detail. The present table is a table representing each volume in each server corresponds to which logical volume and which RAID group via which port in the storage device, and it is a table to which records are added by the server performance information collection program 101.

In the present embodiment, the present table includes a server column 611 and a volume column 612, serving as columns for uniquely identifying servers and volumes. The present table includes a storage column 613, a port column 614, a logical volume column 615, and a RAID group column 616, which represent each volume is using which one of storage devices, ports, and logical volumes and RAID groups.

In the present embodiment, it is supposed that the server storage mapping table 320 has only the latest mapping information. However, it is also possible to add a mapping information acquisition time column to the present table to provide the present table with past history information of the mapping information, and thereby create a report having related server groups narrowed down on the basis of the past mapping information.

FIG. 7 is a diagram showing data items stored in the storage RAID group performance information table 330 in detail. The present table is a table storing I/O performance information for respective RAID groups in respective storage devices, and it is a table to which records are added by the storage performance information collection program 102. In the present embodiment, the present table includes a storage column 711 and an RAID group column 712, serving as columns for uniquely identifying RAID groups on storage devices. The present table includes an IOPS (IO per second) column 713, a Read IOPS (IO per second) column 714 and a Write IOPS (IO per second) column 715 respectively representing the number of IO times, the number of read IO times and the number of write IO times per second for respective RAID groups.

The present table includes an Xfer (Transfer) column 716, a Read Xfer (Transfer) column 717 and a Write Xfer (Transfer) column 718 respectively representing the transfer data quantity, the read transfer data quantity and the write data quantity per second for respective RAID groups. Finally, the present table includes a TS column 719 representing time when the performance information was observed.

FIG. 8 is a diagram showing data items stored in the storage port performance information table 340 in detail. The present table is a table storing I/O performance information for respective ports in respective storage devices, and it is a table to which records are added by the storage performance information collection program 102.

In the present embodiment, the present table includes a storage column 811 and a port column 812, serving as columns for uniquely identifying ports on storage devices. The present table includes an IOPS (IO per second) column 813, a Max IOPS (IO per second) column 814 and a Min IOPS (IO per second) column 815 respectively representing the number of IO times, the maximum number of IO times and the minimum number of IO times per second for respective ports. The present table includes an Xfer (Transfer) column 816, a Read Xfer (Transfer) column 817 and a Write Xfer (Transfer) column 818 respectively representing the transfer data quantity, the maximum transfer data quantity and the minimum data quantity per second for respective ports. Finally, the present table includes a TS column 819 representing time when the performance information was observed.

FIG. 9 is a diagram showing SCSI inquiry response information. SCSI inquiries can be issued from the server to respective volumes. The issued SCSI inquiry is transferred to a storage device via the SAN. The storage device returns SCSI inquiry response information shown in FIG. 9 to the server side as its response.

In the present embodiment, the server performance information collection program 101 issues SCSI inquiries to volumes on respective servers, and acquires information of a storage device side of connection destination by utilizing returned SCSI inquiry response information. Furthermore, in the present embodiment, the SCSI inquiry response information holds a storage device name, a port name, a logical volume name and a RAID group name of the connection destination in a connection destination storage column 911, a connection destination port column 912, a connection destination logical volume column 913 and a connection destination RAID group column 914.

Here, an example in which various kinds of information are collected by using an SCSI command is shown as an example. However, information may be collected by using a method other than this.

FIG. 10 is a flow chart showing processing of the server performance information collection program 101. The server performance information collection program 101 is a program for acquiring performance information and storage device information of connection destination for all volumes on a server on which the present program operates and adding records to the performance information repository 103.

At step 1001, initialization processing for repetitively conducting processing for all volumes in the server is conducted.

At step 1002, the OS is requested to acquire the performance information of the volume and its result is acquired. In the present embodiment, the number of IO times, the number of read IO times and the number of write IO times per second, the transfer data quantity, the read transfer data quantity and the write data quantity per second are acquired for respective volumes, as an example.

At step 1003, the performance information of the volume acquired at the step 1002 is added to the server performance information table 310 together with a time stamp.

At step 1004, a SCSI inquiry is issued for the volume and SCSI inquiry information 910 is acquired. Furthermore, information of the storage device, port, logical volume and RAID group that are being utilized by the volume is extracted from the acquired SCSI inquiry information 910.

At step 1005, connection destination information of the volume acquired at the step 1004 is assed to the server storage mapping table 320. If mapping information of the volume already exists, it is deleted and then addition is conducted.

At step 1006, it is checked whether the volume is the last volume on the server. If the volume is the last volume, the processing is finished. If there are still remaining volumes, the processing returns to the step 1002.

FIG. 11 is a flow chart showing processing of the storage performance information collection program 101. The storage performance information collection program 101 is a program for acquiring performance information for all ports and RAID groups on the storage device on which the present program operates, and adding records to the performance information repository 103.

At step 1101, initialization processing for repetitively conducting processing for all ports in the storage device is conducted.

At step 1102, the storage device is requested to acquire the performance information of the port and its result is acquired. In the present embodiment, the number of IO times, the maximum number of IO times and the minimum number of IO times per second, the transfer data quantity, the maximum transfer data quantity and the minimum data quantity per second are acquired for respective ports, as an example.

At step 1103, the performance information of the port acquired at the step 1102 is added to the storage port performance information table 340 together with a time stamp.

At step 1104, it is checked whether the port is the last port on the storage device. If the port is the last port, the processing proceeds to step 1105. If there is a remaining port, the processing returns to the step 1102.

At step 1105, initialization processing for repetitively conducting processing for all RAID groups in the storage device is conducted.

At step 1106, the storage device is requested to acquire the performance information of the RAID group and its result is acquired. In the present embodiment, the number of IO times, the number of read IO times and the number of write IO times per second, the transfer data quantity, the read transfer data quantity and the write data quantity per second are acquired for respective RAID groups, as an example.

At step 1107, the performance information of the RAID group acquired at the step 1106 is added to the storage RAID group performance information table 330 together with a time stamp.

At step 1108, it is checked whether the RAID group is the last RAID group on the storage device. If the RAID group is the last RAID group, the processing is finished. If there is a remaining RAID group, the processing returns to the step 1106.

Figure 12:
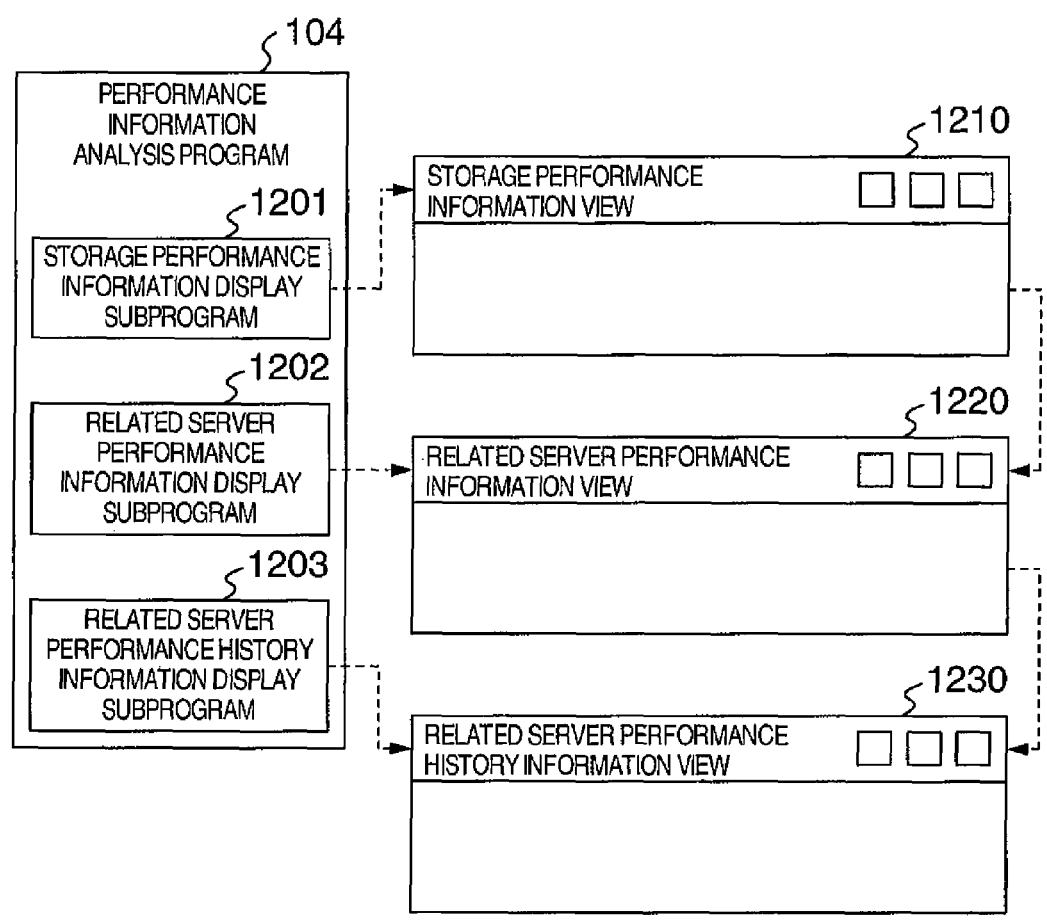
FIG. 12 is a diagram showing an internal structure of a performance information analysis program and schematic views that are output by the performance information analysis program.

FIG. 12 is a diagram showing an internal structure of the performance information analysis program 104 and schematically showing a view that is output by the present program.

The performance information analysis program 104 includes three internal subprograms, i.e., a storage performance information display subprogram 1201, a related server performance information display subprogram 1202 and a related server performance history information display subprogram 1203.

The storage performance information display subprogram 1201 is a program for providing the user with performance information of ports and RAID groups in the storage device by displaying a storage performance information view 1210.

The related server performance information display subprogram 1202 is a program for narrowing down volumes to volumes on the server side utilizing ports or RAID group resources of a certain specific storage side and displaying performance information of a plurality of server side volumes by displaying a related server performance information view 1220.

The related server performance information view 1220 is started from the storage performance information view 1210 according to a user's request. By watching the related server performance information view 1220, it becomes easy for the user to discriminate a server that burdens a load on a specific resource in the storage device. And by perusing the performance information of the server group at a stroke, a server that especially burdens load on the resource can be discriminated.

The related server performance history information display subprogram 1203 is a program for displaying performance history information of a server group using a specific resource in the storage device in a time series form in the order of time when performance information was observed by displaying a related server performance history information view 1230. The related server performance history information view 1230 is started from the related server performance information view 1220 according to a user's request.

Figure 13:
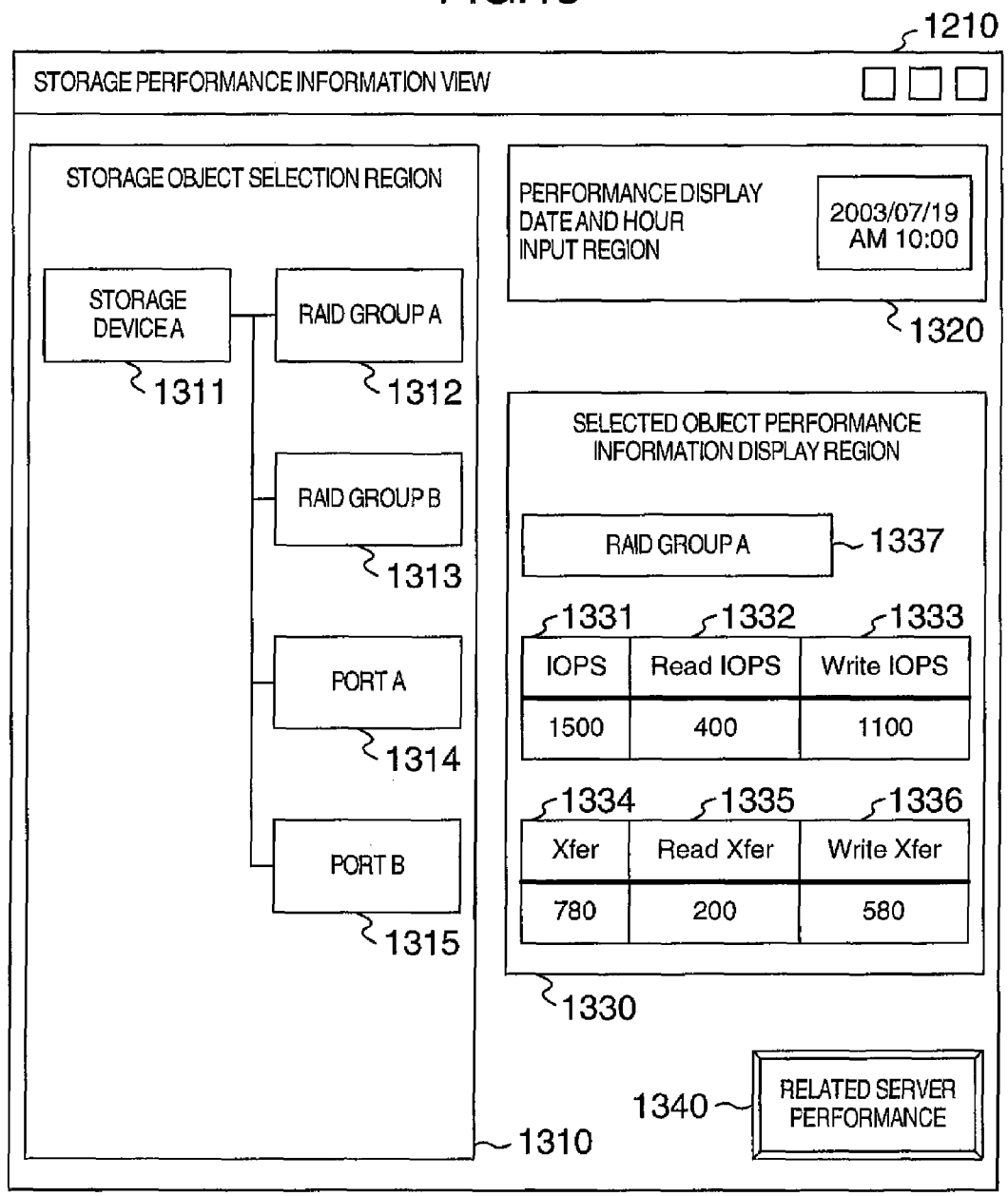
FIG. 13 is a diagram showing an embodiment of a storage performance information view.

FIG. 13 is a diagram showing an embodiment of the storage performance information view 1210. The present view includes a storage object selection region 1310, a performance display date and hour input region 1320, a selected object performance information display region 1330 and a related server performance display button 1340.

In the present embodiment, a storage device and resources within the storage device are displayed in a tree form in the storage performance information view 1210. Specifically, in FIG. 13, a storage device A node 1311 is displayed as a parent node of the tree, and RAID groups and ports are displayed as child nodes like a RAID group A node 1312, a RAID group B node 1313, a port A node 1314 and a port B node 1315. The user can select one of the child nodes in the present storage object selection region, and performance information concerning the selected object is displayed in the selected object performance information display region 1330.

In the present embodiment, kinds of resources within the storage to be subjected to the performance analysis are two kinds, i.e., the RAID group and port. However, the present embodiment can also be applied to other resources such as cache memories in the storage device, and the application is not limited.

The performance display date and hour input region 1320 is a region for the user to input the time when the performance information to be displayed. Performance information at the date and hour that has been input to the region is retrieved and displayed in the selected object performance information display region 1330. As for the specification of the date and hour for displaying the performance information, the program may previously specify that the current time should be displayed, or performance information in a predetermined interval may be displayed in time series order according to data accepted by the user. Other specification is also possible.

The selected object performance information display region 1330 is a region for displaying performance information concerning an object selected in the storage object selection region 1310 as regards the date and hour that has been input in the performance display date and hour input region 1320.

In FIG. 13, it is supposed that the RAID group A node 1312 has been selected in the storage object selection region 1310 and "10 a.m., Jul. 19, 2003" has been input as the performance display date and hour. Therefore, performance information of the RAID group A at 10 a.m., Jul. 19, 2003 is displayed in the selected object performance information display region 1330. Specifically, the selected resource name, i.e., "RAID group A" is displayed in a selected object display region 1337, and the performance information of the RAID group A at 10 a.m., Jul. 19, 2003 is displayed in an IOPS (IO per second) column 1331, a Read IOPS (IO per second) column 1332, a Write IOPS (IO per second) column 1333, an Xfer (Transfer) column 1334, a Read Xfer (Transfer) column 1335 and a Write Xfer (Transfer) column 1336.

The related server performance display button 1340 is a button for requesting the display of the related server performance information view 1220. By pressing the present button, it is possible to display the related server performance information view 1220 for displaying the performance information of a volume on the server side utilizing an object selected in the storage object selection region 1310. On the inside, the present button starts the related server performance information display subprogram 1202.

FIG. 14 is a diagram showing an embodiment of the related server performance information view 1220. The present view is a view that displays a list of servers and volumes utilizing a specific RAID group or port, and their performance information. By watching the present view, the user can discriminate a server and a volume that burden the load on a specific RAID group or port.

The related server performance information view 1220 includes a related server performance information display region 1410 and a history information display button 1420.

The related server performance information display region 1410 is a region for displaying a list of related servers and volumes and their performance information. In the present embodiment, the related server performance information display region 1410 includes a server column 1421 and a volume column 1422 for specifying a server and a volume that utilize the RAID group or port. Furthermore, in the present embodiment, an IOPS (IO per second) column 1423, a Write IOPS (IO per second) column 1424, a Read IOPS (IO per second) column 1425, an Xfer (Transfer) column 1426, a Read Xfer (Transfer) column 1427 and a Write Xfer (Transfer) column 1428 are displayed as the performance information of the volume in the related server performance information display region 1410.

The history information display button 1420 is a button for requesting the display of the related server performance history information view 1230. By pressing the present button, the related server performance history information view 1230 for historically displaying the performance information of the related server group can be displayed. On the inside, the present button starts the related server performance history information display subprogram 1203.

Figure 15:
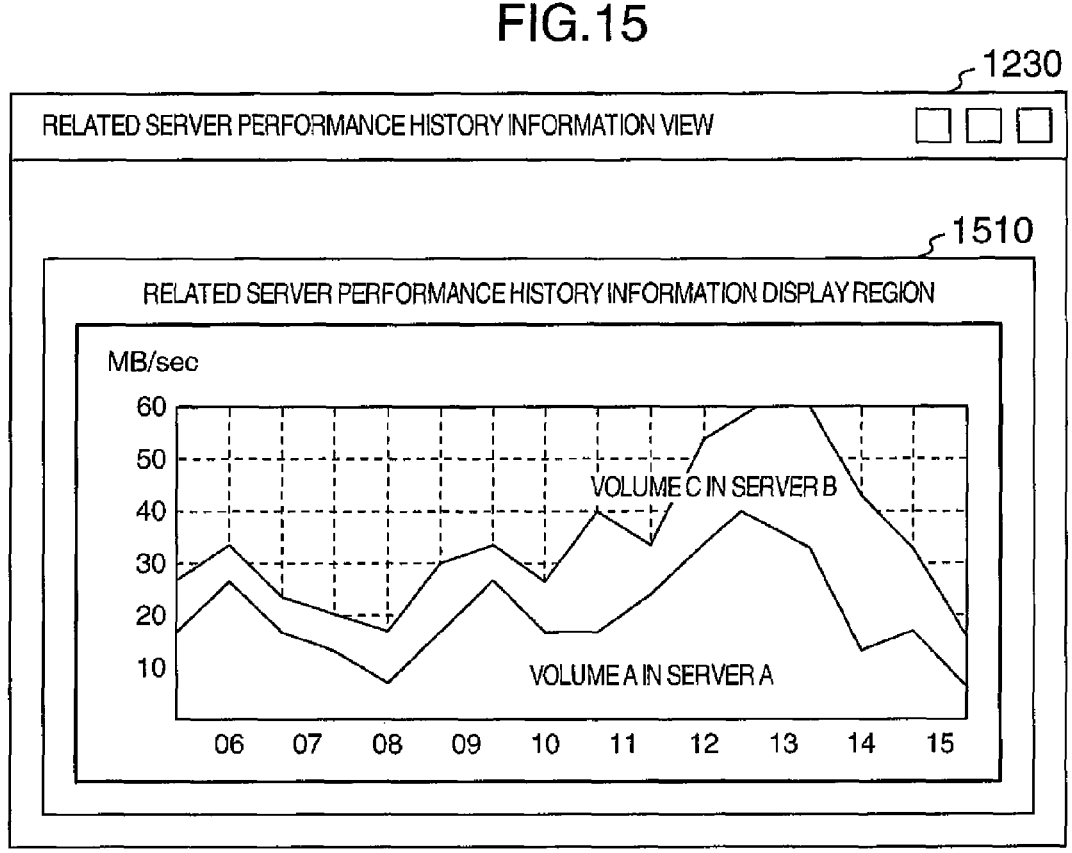
FIG. 15 is a diagram showing an embodiment of a related server performance history information view.

FIG. 15 is a diagram showing an embodiment of the related server performance history information view 1230. The present view historically displays the performance information of the related server group. The present view includes a related server performance history information display region 1510. Historical performance information of the related server is displayed in the related server performance history information display region 1510 by broken line graphs as shown in FIG. 15.

In FIG. 15, the abscissa of the graph indicates time, and the ordinate of the graph indicates performance, as an example. Performance history data for the volume A in the server A and performance history data for the volume C in the server B are displayed by superposition of broken line graphs, and a server name and a volume name are added to each of the broken line graphs. However, this is an example, and performance information of devices other than servers may also be displayed.

For example, performance information may be displayed by using one view every logical volume. In the case where volumes recognized by respective servers utilize the same RAID group, the performance information may be displayed by using a window every RAID group. Or other display methods may also be used.

It is also possible to partition one window into a plurality of parts and display various devices in a tree structure on a left-hand part of the window as represented by 1310 in FIG. 13. When the user has selected one of components in the tree structure shown in 1310, performance history information display of related devices (for example, FIG. 15) may be conducted on a right-hand part of the window on the basis of the user's selection.

Information data of devices sharing a storage device specified by the user may be superposed and displayed by using graphs having the same coordinate axes. The performance information of the specified storage device and performance information data of three devices having the highest loads among devices utilizing the specified storage device may be displayed so as to be associated with each other. A different display method may also be used. When displaying a plurality of performance information data, the performance information data may be displayed in one window so as to be superposed in the order of increasing value, the performance information data may be displayed in one window in accordance with a predetermined order, or a plurality of windows may be displayed side by side in the horizontal direction or the vertical direction in association.

Thus, performance data of the devices and computers are not shown singly, but they are displayed in association with performance information of related devices on a path between a server and a storage device and performance information of devices sharing the storage device. As a result, it becomes easy to discriminate a part that becomes a performance bottleneck even in a complicated system environment.

It becomes possible to narrow down and display performance information data of related devices from among a large number of performance information data. It becomes easy for a human being to understand the performance information.

Figure 16:
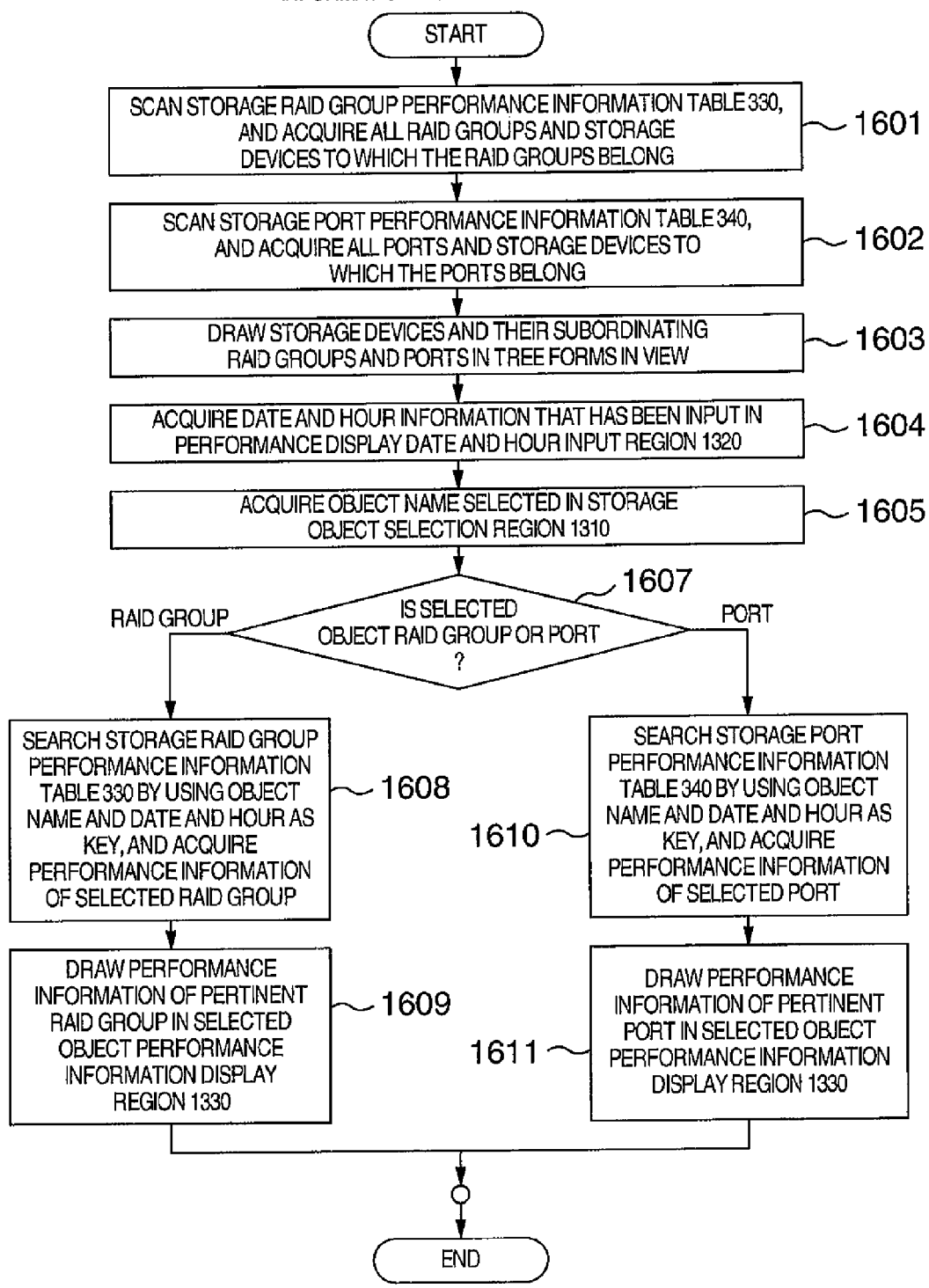
FIG. 16 is a flow chart showing processing of a storage performance information display subprogram.

FIG. 16 is a flow chart showing processing of the storage performance information display subprogram 1201. The present program is a program for displaying the storage performance information view 1210.

The present program is broadly divided into two kinds of processing. Steps 1601 to 1603 are processing for drawing the storage object selection region 1310. Processing ranging from the step 1604 to end processing is processing for drawing the selected object performance information display region 1330.

At step 1601, the storage RAID group performance information table 330 is scanned, and a list of pairs of all RAID groups and storage devices to which the RAID groups belong is acquired.

At step 1602, the storage port performance information table 340 is scanned, and a list of pairs of all ports and storage devices to which the ports belong is acquired.

At step 1603, all storage devices, RAID groups and ports are drawn in the storage object selection region 1310 on the basis of the list of RAID groups paired with storage devices and the list of ports paired with storage devices acquired respectively at the steps 1601 and 1602.

At step 1604, date and hour information that has been input in the performance display date and hour input region 1320 is acquired.

At step 1605, a name of an object selected in the storage object selection region 1310 is acquired. For example, specification of an identifier of an RAID group, a port name, and a name and an identifier of a storage related device is accepted.

At step 1607, on the basis of the name of the storage object acquired at the step 1605, it is determined whether the object is an RAID group or a port. If the object is a RAID group, the processing proceeds to a step 1608. If the object is a port, the processing proceeds to step 1610.

At step 1608, the storage RAID group performance information table 330 is searched by using the object name acquired at the step 1605 and the date and hour acquired at the step 1604 as a key, and performance information of the selected RAID group at the specified date and hour is acquired.

At step 1609, performance information of the RAID group acquired at the step 1608 is drawn in the selected object performance information display region 1330.

At step 1610, the storage port performance information table 340 is searched by using the object name acquired at the step 1605 and the date and hour acquired at the step 1604 as a key, and performance information of the selected port at the specified date and hour is acquired.

At step 1611, performance information of the port acquired at the step 1610 is drawn in the selected object performance information display region 1330.

Figure 17:
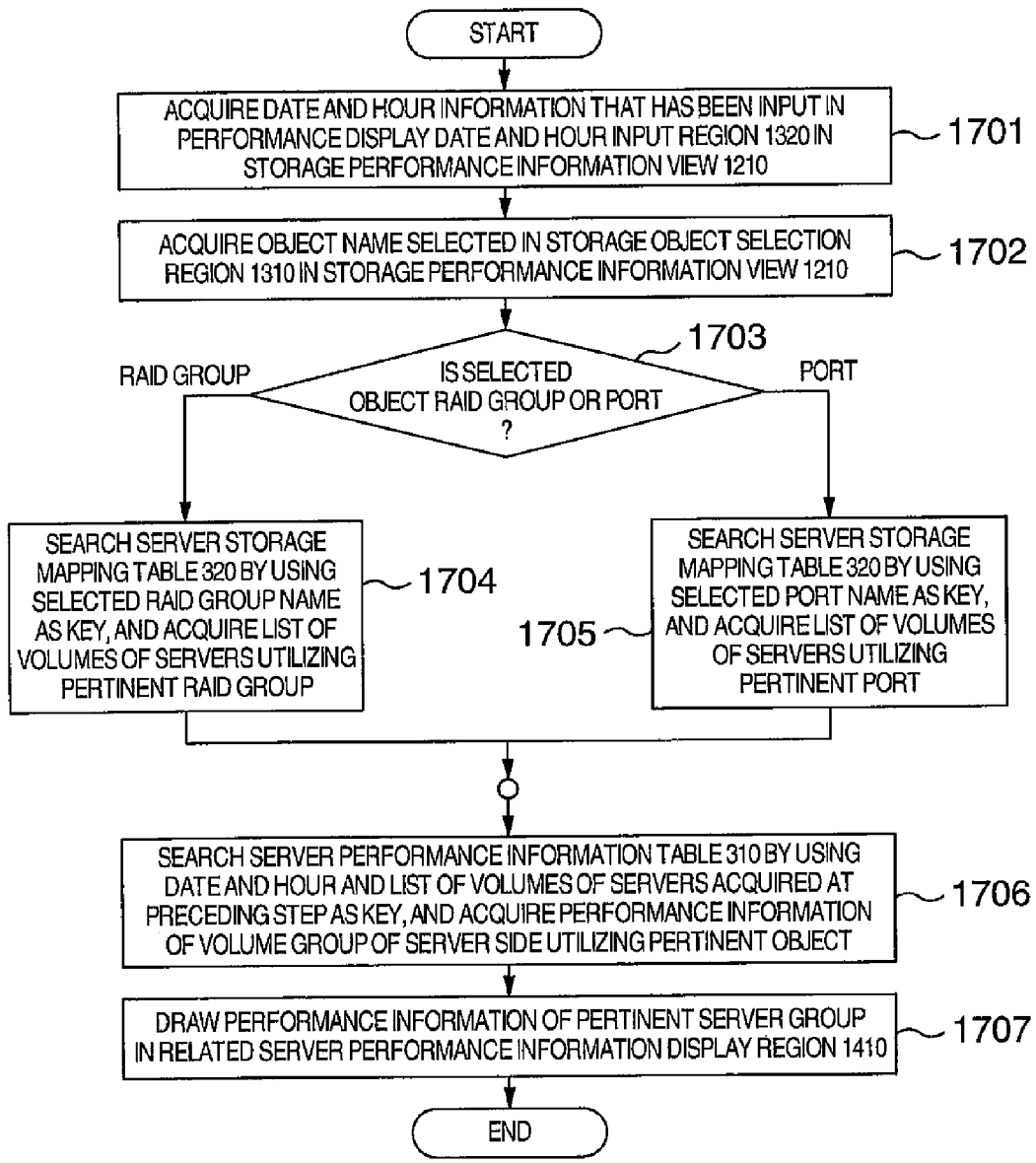
FIG. 17 is a flow chart showing processing of a related server performance information display subprogram.

FIG. 17 is a flow chart showing processing of the related server performance information display subprogram 1202. The present program is a program that is executed to draw the related server performance information view 1220 when the user has pressed the related server performance display button 1340 on the storage performance information view 1210.

At step 1701, date and hour information that has been input in the performance display date and hour input region 1320 is acquired.

At step 1702, a name of an object selected in the storage object selection region 1310 is acquired.

At step 1703, on the basis of the name of the storage object acquired at the step 1702, it is determined whether the object is an RAID group or a port. If the object is a RAID group, the processing proceeds to a step 1704. If the object is a port, the processing proceeds to step 1705.

At step 1704, the server storage mapping table 320 is searched by using the object name acquired at the step 1702 as a key for the RAID group column, and a list of volumes of servers utilizing the RAID group is acquired.

At step 1705, the server storage mapping table 320 is searched by using the object name acquired at the step 1702 as a key for the port column, and a list of volumes of servers utilizing the port is acquired.

At step 1706, the server performance information table 310 is searched by using the date and hour acquired at the step 1701 and the volume list of servers acquired at the step 1704 or 1705 as a key, and performance information of the volume group of the server side utilizing the RAID group or the port is acquired.

At step 1707, performance information of the related server acquired at the step 1706 is drawn in the related server performance information display region 1410.

Figure 18:
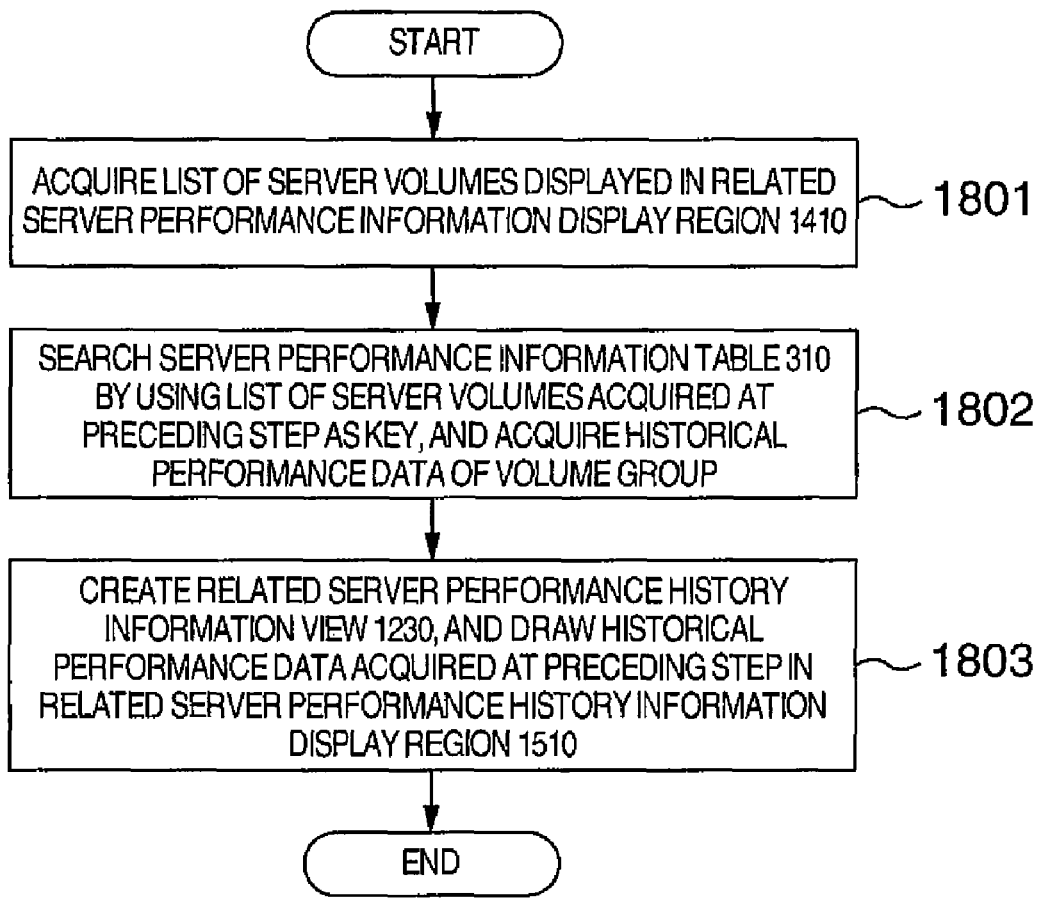
FIG. 18 is a flow chart showing processing of a related server performance history information display subprogram.

FIG. 18 is a flow chart showing processing of the related server performance history information display subprogram 1203. The present program is a program that is executed to draw the related server performance history information view 1230 when the user has pressed the history information display button 1420 on the related server performance information view 1220.

At step 1801, a list of volumes of the server side displayed in the related server performance information region 1410 is acquired.

At step 1802, the server performance information table 310 is searched by using the volume list of the server side acquired at the step 1801 as a key, and historical performance data of the volume group is acquired.

At step 1803, the related server performance history information view 1230 is created, and historical performance data of related volumes acquired at the step 1802 are drawn in the related server performance history information display region 1510.

The above-described processing and display transition are an example, and different view transition may be conducted. For example, in the case where the user has specified the RAID group A node 1312 in the view shown in FIG. 13 with a mouse pointer or the like, load information of a plurality of servers utilizing the RAID group A may be displayed in a form of superposed graphs (for example, as shown in FIG. 15). Furthermore, a port may be specified and load information of a server utilizing the port may be displayed on the basis of the specified port information. Or it is also possible to associate route information utilizing the port with a storage device on the route (for example, in a form such as "server—volume name—switch (I/O port)—logical volume—RAID group—physical disk"), and display information relating to each of the storage devices. Different display may also be conducted.

Furthermore, in the case where the fact that the I/O performance of a certain server has degraded is detected, it is also possible to regard the server degraded in performance as a reference point and display performance information of ports utilized by the server and information of servers utilizing the ports. Or it is also possible to check logical volumes and RAID groups utilized by the server, and display performance information of other servers sharing and utilizing the logical volumes and RAID groups.

As described above, according to the storage resource contention situation detection method, a specific resource within the storage device is regarded as the starting point, and performance index values of the server group (or various devices) that burdens the load on the resource are displayed at a stroke. In a configuration in which a plurality of servers share and utilize a single storage device, therefore, it is possible to easily detect concentration of I/O loads on a resource within the storage device and easily discriminate servers that burden the load.

Furthermore, in the case where a plurality of storage devices or a plurality of servers share various devices, it becomes easy to grasp the state of a device that becomes a bottleneck in performance of the shared devices by collecting and analyzing performance information of related devices.

According to the present invention, performance values of devices that burden the load on a storage device are displayed in association. As a result, it is possible to easily discriminate a server group that causes I/O contention on a resource in the storage device, or a part that becomes a bottleneck in performance.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A management computer comprising:
a communication device for communicating with a storage system and a plurality of computers; and
a processor executing to:
store relation information between the storage system and the plurality of computers;
collect a plurality of computer performance information about computer-side I/O loads generated by programs on the plurality of computers, from the plurality of computers;
identify a storage resource from a plurality of storage resources in the storage system;
identify computer performance information from the plurality of computer performance information based on the relation information; and
output the identified computer performance information to a display,
wherein the identified computer performance information corresponds to a certain computer-side I/O load that generates a load to the identified storage resource.

2. A management computer according to claim 1,
wherein a type of the identified computer performance information is an IOPS or a transfer rate.

3. A management computer according to claim 1,
wherein the processor executes to output the identified computer performance information to the display so that a historical graph of the identified computer performance information can be displayed.

4. A management computer according to claim 1,
wherein the processor executes to output the identified computer performance information to the display so that at least one numeric value of the identified computer performance information can be displayed.

5. A management computer according to claim 1,
wherein the processor executes to output another performance information on an I/O route used when the certain computer-side I/O load generates the load to the identified storage resource to the display.

6. A management computer according to claim 5,
wherein the another performance information indicates performance information of a switch device on the I/O route.

7. A management computer according to claim 1,
wherein the display has a view that includes a first region showing the identified computer performance information, and
wherein, to another region in the view, the processor executes to display a storage resource tree of the plurality of storage resources for acquiring an ID of the identified storage resource.

8. A management computer according to claim 1, further comprising:
the display device.

9. A management computer according to claim 1,
wherein the plurality of computer performance information are performance information of a plurality of computer-side volumes configured in the plurality of computers.

10. A management computer according to claim 1,
wherein the processor executes to:
identify a certain computer from the plurality of computers; and
output storage performance information corresponding to at least one storage resource which the identified certain computer utilizes.

11. A management computer according to claim 10,
wherein the processor executes to further identify another computer performance information from the plurality of computer performance information based on the relation information, output the further identified another computer performance information to the display, and
wherein the further identified another computer performance information corresponds to the at least one storage resource which the identified certain computer utilizes.

12. A system comprising:
a plurality of computers;
a storage system; and
a management computer having a processor executing to:

store relation information between the storage system and the plurality of computers;

collect a plurality of computer performance information about computer-side I/O loads generated by programs on the plurality of computers, from the plurality of computers;

identify a storage resource from a plurality of storage resources in the storage system;

identify computer performance information from the plurality of computer performance information based on the relation information; and output the identified computer performance information to a display, wherein the identified computer performance information corresponds to a certain computer-side I/O load that generates a load to the identified storage resource.

13. A system according to claim 12,
wherein a type of the identified computer performance information is an IOPS or a transfer rate.

14. A system according to claim 12,
wherein the processor executes to output the identified computer performance information to the display so that the a historical graph of the identified computer performance information can be displayed.

15. A system according to claim 12,
wherein the processor executes to output the identified computer performance information to the display so that at least one numeric value of the identified computer performance information can be displayed.

16. A system according to claim 12,
wherein the processor executes to output another performance information on an I/O route used when the certain computer-side I/O load generates the load to the identified storage resource to the display.

17. A system according to claim 16,
wherein the another performance information indicates performance information of a switch device on the I/O route.

18. A system according to claim 12,
wherein the display has a view that includes a first region showing the identified computer performance information, and wherein, to another region in the view, the processor executes to display a storage resource tree of the plurality of storage resources for acquiring an ID of the identified storage resource.

19. A system according to claim 12, further comprising:
the display device.

20. A system according to claim 12,
wherein the plurality of computer performance information are performance information of a plurality of computer-side volumes configured in the plurality of computers.

21. A system according to claim 12,
wherein the processor executes to:
identify a certain computer from the plurality of computers; and
output storage performance information corresponding to at least one storage resource which the identified certain computer utilizes.

22. A system according to claim 12,
wherein the processor executes to further identify another computer performance information from the plurality of computer performance information based on the relation information, output the further identified another computer performance information to the display, and wherein the further identified another computer performance information corresponds to the at least one storage resource which the identified certain computer utilizes.

23. A non-transitory computer readable storage medium storing a program in a memory of a management computer, the management computer having a communication device for communicating with a storage system and a plurality of computers, the program causing a processor of the management computer to execute code to:

store relation information between the storage system and the plurality of computers;

collect a plurality of computer performance information about computer-side I/O loads generated by programs on the plurality of computers, from the plurality of computers;

identify a storage resource from a plurality of storage resources in the storage system;

identify computer performance information from the plurality of computer performance information based on the relation information; and output the identified computer performance information to a display, wherein the identified computer performance information corresponds to a certain computer-side I/O load that generates a load to the identified storage resource.

24. A non-transitory computer readable storage medium according to claim 23,
wherein a type of the identified computer performance information is an IOPS or a transfer rate.

25. A non-transitory computer readable storage medium according to claim 23,
wherein the processor executes code to output the identified computer performance information to the display so that the a historical graph of the identified computer performance information can be displayed.

26. A non-transitory computer readable storage medium according to claim 23,
wherein the processor executes code to output the identified computer performance information to the display so that at least one numeric value of the identified computer performance information can be displayed.

27. A non-transitory computer readable storage medium according to claim 23,
wherein the processor executes code to output another performance information on an I/O route used when the certain computer-side I/O load generates the load to the identified storage resource to the display.

28. A non-transitory computer readable storage medium according to claim 23,
wherein the another performance information indicates performance information of a switch device on the I/O route.

29. A non-transitory computer readable storage medium according to claim 23,
wherein the display has a view that includes a first region showing the identified computer performance information, and wherein, to another region in the view, the processor executes code to display a storage resource tree of the plurality of storage resources for acquiring an ID of the identified storage resource.

30. A non-transitory computer readable storage medium according to claim 23, further comprising:
the display device.

31. A non-transitory computer readable storage medium according to claim 23,
  wherein the plurality of computer performance information are performance information of a plurality of computer-side volumes configured in the plurality of computers.

32. A non-transitory computer readable storage medium according to claim 23,
  wherein the processor executes code to:
  identify a certain computer from the plurality of computers; and
  output storage performance information corresponding to at least one storage resource which the identified certain computer utilizes.

33. A non-transitory computer readable storage medium according to claim 32,
  wherein the processor executes code to further identify another computer performance information from the plurality of computer performance information based on the relation information, output the further identified another computer performance information to the display, and
  wherein the further identified another computer performance information corresponds to the at least one storage resource which the identified certain computer utilizes.

* * * * *

UNITED STATES PATENT AND TRADEMARK OFFICE
CERTIFICATE OF CORRECTION

| | | |
|---|---|---|
| PATENT NO. | : 8,407,414 B2 | Page 1 of 1 |
| APPLICATION NO. | : 13/418724 | |
| DATED | : March 26, 2013 | |
| INVENTOR(S) | : Takeda et al. | |

It is certified that error appears in the above-identified patent and that said Letters Patent is hereby corrected as shown below:

Please correct the Title page as follows:

In the Notice section please add the following sentence:

--This patent is subject to a terminal disclaimer.--

Signed and Sealed this
Thirteenth Day of August, 2013

Teresa Stanek Rea
*Acting Director of the United States Patent and Trademark Office*